INVENTOR.
JAMES M. LAPEYRE
BY
ATTORNEYS 3,616,747
Patented Nov. 2, 1971

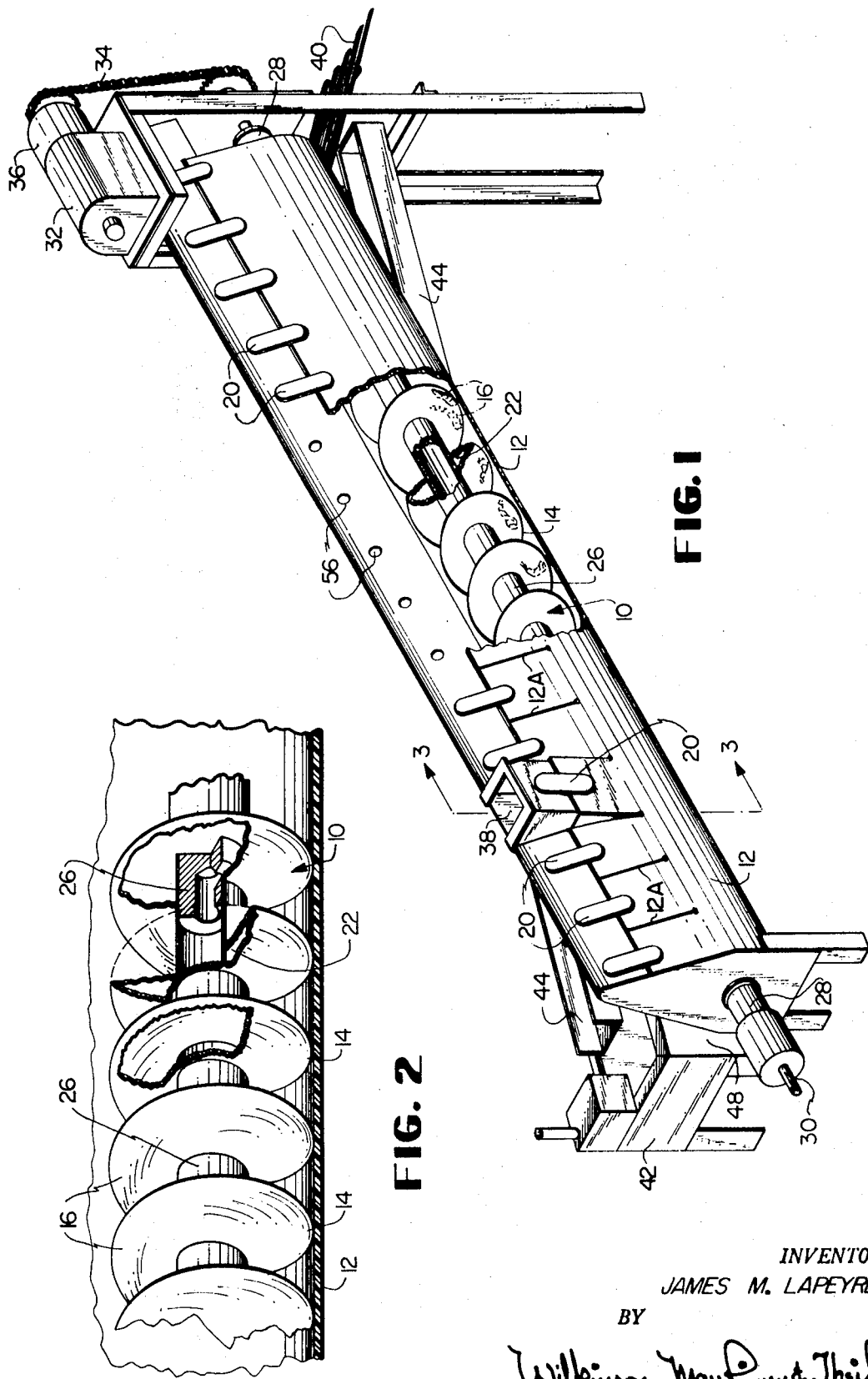

3,616,747
ARCHIMEDEAN SCREW TYPE COOKER CONVEYOR
James M. Lapeyre, New Orleans, La., assignor to
Laitram International, Inc., New Orleans, La.
Filed Mar. 26, 1969, Ser. No. 810,701
Int. Cl. A47j 35/00
U.S. Cl. 99—405
3 Claims

ABSTRACT OF THE DISCLOSURE

This disclosure relates to a cooker conveyor and method of cooking therewith in which a hollow Archimedean screw has a flexible and/or resilient blanket wrapped about it in water tight seal therewith and in which a heating fluid such as steam is passed through the screw to heat a conveying medium such as water into which the product to be cooked is introduced. As the screw rotates, the product to be cooked and the conveying medium are advanced along the length of the screw in discrete pockets of liquid conveying medium which is elevated to cooking temperature by the heating fluid passed through the hollow flights of the Archimedean screw. The axis of the screw may be horizontal, inclined or declined due to the water tight seal between the flights of the screw and the flexible blanket wrapped thereabout.

---

This invention relates to continuous hot liquid food cookers, and in particular to a new and improved cooker of the heated Archimedean screw type suitable for blanching and other cooking in liquid operation.

In commercial food canning and freezing plants, some products such as shrimp, peas, beets, brussel sprouts, spinach, string beans, lima beans, potatoes, carrots, etc., are subjected to heat treatment in hot or boiling water as a necessary processing step in the preparation of the product. This treatment is called blanching and usually follows certain preparatory operations such as peeling, sorting, clipping, destemming, vining, husking, etc. In some instances, it precedes certain peeling and cutting operations where the product requires softening and/or pre-cooking.

A purpose of blanching in commercial canneries is to reduce product moisture content, which otherwise would be driven off in the can sterilization process, resulting in excess liquid and insufficient product in the can, causing the canned product to fall short of the standard or legal weight and/or volume requirements. Other purposes of blanching include deactivation of certain enzymes, effecting desired color changes, removal of undesired or objectionable flavors and oils, and in some instances a softening of the product. Obviously, another purpose is simply to cook the product before it is canned, frozen, or as is the practice of some packers, dried.

In the majority of cases, the temperature and duration of the blanching operation is important, since insufficient or excessive blanching can downgrade both the quality and economic value of the product and be troublesome in subsequent processing steps. Additionally, by the time the product is ready for the blanching operation, it has usually undergone some of the other preparatory steps named above, and in some cases much effort and money has been expended on the product, thereby increasing its costs, which, as for instance in the case of shrimp, is expensive in the raw. Down-grading and/or loss of product is costly and occurs in conventional continuous Archimedean screw type blanchers which, because of the mechanical necessity for clearance between the screw and the trough wall, causes pinching, cutting, abrasion and sometimes other visual deformities of the product. For many products even small clearances cause damage, and non-screw type cookers must be resorted to.

Conventional Archimedean screw-type continuous cookers combine a metal screw and a metal trough of complemental contour. Either the screw, or the trough, or both may be heated, which is usually accomplished by pressurized steam. The construction is rigid, requiring a dimensional clearance between the screw and the co-operating metal trough. The attainable minimum clearance varies, and small clearances become increasingly difficult to attain with increases in screw length and diameter. This problem is compounded in the case of hollow flighted internally heated screws. Clearances may vary from a few thousandths of an inch in the case of short expertly constructed cookers, to large fractions of an inch, or even multiples of an inch in very long and/or poorly manufactured cookers. The very heat necessary for the cooking operation is sufficient to cause clearance problems due to non-uniform expansion of the metal structures. Clearances may vary even in a single cooker, depending upon the precision of manufacture and the "trueness" of the cooperating surfaces. Worse, it may vary in a single revolution of the screw in the same cooker, depending upon the "trueness" of turning of the screw. When the latter variation occurs, a chopping effect, ruinous to some products, results with each screw revolution at various points between the screw and the trough along the length of the cooker, usually becoming more pronounced at the mid-length of the cooker. Obviously, these conditions cause costly product damage. Furthermore, clearances between the screw and the rigid trough walls permit the cooking liquid to flow uncontrollably via the clearances from flight to flight, thereby creating a liquid level differential between flights and between the input to the output ends of the cooker. Such conditions make the liquid-to-product ratio, and hence the heat-to-product transfer rates, very difficult to control. In attempts to solve these problems, flexible edges, capable of accommodating dimensional inaccuracies, for attachment to the screw flights, to form water-tight seals between the screw flights and the trough walls, may be employed, but the practical problems of fastening, cleaning and maintaining such attachments have substantially precluded their practical adoption in screw cooker manufacture. In addition to the above problems encountered in conventional screw type cooker, cleaning as a problem may be added to the list.

The chief advantages of the internally heated Archimedean screw are simplicity, excellent heat transfer characteristics, and ease of cleaning. Its greatest disadvantage lies in the fact that it conventionally requires extreme precision of manufacture when it is combined with a rigid complementally contoured trough. Since the clearance between the Archimedean screw and the flexible sheath or screw covering of the present hot liquid flotation cooker is zero, and contact between the screw and cover are automatically maintained, regardless of screw eccentricities, the need for difficult manufacturing tolerances is completely eliminated.

Accordingly, among the objects of the present invention is the provision of a continuous, hot liquid, internally heated screw cooker which minimizes or altogether eliminates product damage.

A further object of the present invention is the provision of a continuous, hot liquid, internally heated screw cooker in which the cooking liquid is captured between heated flights and moved positively through the cooker to assure controlled liquid-to-product ratio throughout the cooker and throughout the duration of the cook, thus providing greater uniformity of cook to product.

Another object of the present invention is the provision of a continuous, hot liquid, internally heated screw cooker which provides for excellent cleanability and in which all surfaces that contact the food product become readily accessible within minutes for scouring by the simple expedient detaching of a flexible sheath, which, if desired, may be separately cleaned.

A still further object of the invention is the provision of a continuous, hot liquid, heated screw cooker which may be manufactured to greater dimensional tolerances, thus resulting in economic savings in manufacturing costs.

Still another object of the invention is the provision of a continuous, hot liquid, heated screw cooker which may be manufactured in longer length without increase in manufacturing precision, thereby making possible higher capacity screw-type cookers capable of longer cooking durations.

Importantly, another object of the present invention is to provide a continuous, hot liquid, heated screw cooker which may be operated in the inclined upward, level, and declined downward positions, thereby permitting the controlled gain, maintenance, or loss of in-plant product elevation, simultaneously with the cooking operation.

With the foregoing and other objects in view, the invention will be more fully described hereinafter, and will be more particularly pointed out in the claims appended hereto.

In the drawings wherein like symbols refer to like or corresponding parts throughout the several views.

FIG. 1 is a perspective view with parts broken away and parts shown in section of a continuous hot liquid food cooker constructed in accordance with the present invention shown in an attitude of inclination.

FIG. 2 is a fragmentary view taken at an enlarged scale showing the heated screw and blanket of the present invention having parts broken away.

Figure 3:
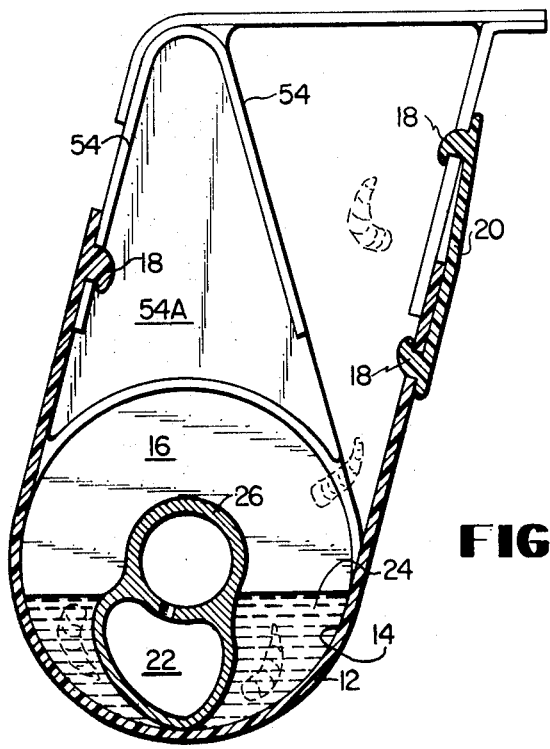
FIG. 3 is a vertical section taken on the lines 3—3 in FIG. 1.

Referring now to FIGS. 1 and 2, the present invention has an internally heatable Archimedean screw 10 wrapped about its lower half, as illustrated in FIGS. 1 and 3, with a flexible water and heat resistant sheath or blanket 12. This sheath serves as a flexible trough and forms a water seal with the edges 14 of the flights 16 of the screw 10. The sheath 12 is of a suitable material such as rubberized fabric or reinforced plastic laminate. It is sufficiently flexible to maintain watertight seals with the flights 16 even though severe eccentricities along the length of the screw 10 may be present.

The sheath 12 is fastened by suitable means, as for instance hooks 18 on one side and by resilient members such as springs or resilient rubber bands 20 on the other side. The resilient members 20 pull the sheath 12 preferably in the direction of screw rotation and only with sufficient force to prevent leakage and maintain the liquid seals at the edges 14 of the flights 16.

The screw flights 16 are of hollow or other suitable construction so as to form passages 22 through which steam may be circulated for heating the surfaces of the screw-flights 16, which in turn maintain a cooking liquid 24 at a proper cooking temperature.

The screw 10 is constructed by welding around the axial pipe or mandrel 26, which in turn is fitted at its ends with suitable bearings 28 and steam couplings 30. Rotation of the screw is provided by any suitable drive means 32 which may be a motor driving a chain 34 and as an optional feature may have a variable speed control 36.

The duration of cook may be controlled by regulating the speed of the screw 10. Cooking time may be further controlled by changing the distance from the material input point 38 to the discharge point 40 at which the product is discharged. This variation of production introduction point 38 is facilitated by providing slits 12A in blanket 12 at uniform spacings which are designed to accommodate the input trough 38.

A water reservoir 42 is provided to maintain water as required at the proper temperature. Water expelled at the end of the blancher is returned to the reservoir 42 via duct or flume 44. When operated in an upwardly inclined arrangement as shown in FIG. 1, the screw 10 lifts the water 24 which eliminates the need for a separate pump for water circulation.

Figure 4:
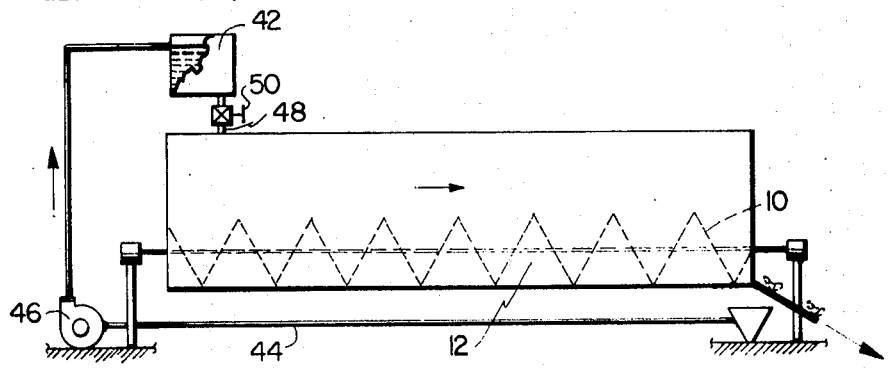
FIG. 4 is a mechanical schematic of the present invention applied to horizontal attitude cooking and conveying.
Figure 5:
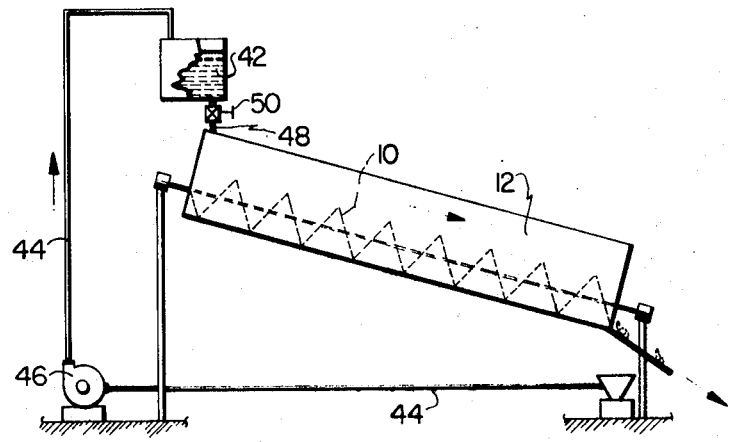
FIG. 5 is a mechanical schematic of the present invention applied to a declining attitude path of cooking and conveying.

When, however, it is desired or necessary to operate the cooker in a level or downwardly declined position as indicated by schematic FIGS. 4 and 5, then a pump 46 becomes necessary.

When salt water is used as the blanching medium, a salinity monitoring device may be employed to control the saline content of the water.

Water is introduced into the cooker at any suitably low position, as for instance through inlet pipe 48. In the event that operations require stoppage of the cooker while loaded with product and water, flow ceases automatically at inlet pipe 48, when the cooker is operating in an upwardly inclined mode. If, however, operation is in the level or downwardly inclined position, then a suitable shut-off valve 50, preferably of automatic design, should be installed to prevent overflow.

As best seen in FIGS. 1 and 3 the screw 10 is mounted in bearings 28 carried by a housing 52 which may be generally of an inverted V construction having side walls 54 and end walls 54a with openings 56 therethrough to accommodate the hooks 18 for retaining the blanket 12 in water seal relationship with the screw 10.

What I claim is:

1. For use with a liquid conveying medium a cooker conveyor comprising an Archimedean screw and frame for supporting same having hollow flights to permit internal passage of a pressurized heated fluid therethrough, a flexible blanket adapted to be wrapped about at least half of the peripheral flights of the screw in fluid tight engagement of its contact area, tensioning means between the frame and flexible blanket to maintain liquid tight relationship between the outer peripheral flights of the screw and the blanket, said Archimedean screw being hollow so that the liquid conveying the material to be cooked will be elevated to cooking temperature by the internal pressurized heated fluid while moving the material in a state of buoyancy along the flights in progressive advancing pockets of heated liquid conveying medium, and means associated with the discharge end of the screw and blanket to return at least a portion of the heated liquid conveying medium to the intake end of the screw and blanket.

2. A cooker as claimed in claim 1 further comprising separating means positioned to remove the cooked material from the conveying medium prior to reintroduction of the conveying medium to the cooker.

3. A cooker as claimed in claim 1 further comprising means associated with the screw to vary the cooking time of material introduced into cooker conveyor.

References Cited

UNITED STATES PATENTS

| | | | |
|---|---|---|---|
| 2,815,117 | 12/1957 | Lapeyre et al. | 198—213 |
| 2,427,388 | 9/1947 | Curran | 99—443 UX |
| 2,606,645 | 8/1952 | Heine | 198—213 X |
| 2,610,033 | 9/1952 | Rietz | 165—87 |
| 2,697,510 | 12/1954 | Morrison | 198—213 |
| 2,888,128 | 5/1959 | Allen | 198—213 X |
| 3,360,108 | 12/1967 | Voss | 198—213 |

FOREIGN PATENTS 165,925   11/1955   Australia   99—443

BILLY J. WILHITE, Primary Examiner

U.S. Cl. X.R.

99—407, 443 C; 165—87; 198—213